United States Patent [19]

Woods

[11] Patent Number: 5,046,688

[45] Date of Patent: Sep. 10, 1991

[54] WING MAJOR ASSEMBLY JIG

[75] Inventor: Quentin T. Woods, Woodinville, Wash.

[73] Assignee: The Boeing Company, Seattle, Wash.

[21] Appl. No.: 263,686

[22] Filed: Oct. 28, 1988

[51] Int. Cl.$^5$ .............................................. B64C 1/100
[52] U.S. Cl. .................................... 244/123; 244/124; 269/47; 269/296
[58] Field of Search ........................... 269/296, 47, 52; 244/123, 124

[56] References Cited

U.S. PATENT DOCUMENTS

| | | | |
|---|---|---|---|
| 1,295,202 | 2/1919 | Popock | 269/296 |
| 1,877,023 | 9/1932 | Northrop | 244/123 |
| 2,314,319 | 3/1943 | Smith | 269/296 |
| 2,342,025 | 2/1944 | Watter | 244/123 |
| 2,563,218 | 8/1951 | Darracott et al. | 244/123 |
| 4,050,685 | 9/1977 | Cox | 269/296 |
| 4,579,271 | 4/1986 | Fujita et al. | 269/296 |

Primary Examiner—Sherman Basinger
Assistant Examiner—Christopher P. Ellis
Attorney, Agent, or Firm—Bruce A. Kaser

[57] ABSTRACT

A "generic" jig is provided for assembling a wing box or, in other words, the major portion of a wing. The jig has an elongated base to which is attached one or more elongated strongback modules. The modules define the position of the wing box's lower spar. Modules may be interchanged as is directed by the particular wing box which is to be assembled. At one end of the jig's base is an inner stand-off module for defining the position of the wing box's root end, and at the other end of the base is an outer stand-off module for defining the position of the wing box's tip end. Both inner and outer stand-off modules are also interchangeable in accordance with the particular wing which is to be constructed.

16 Claims, 4 Drawing Sheets

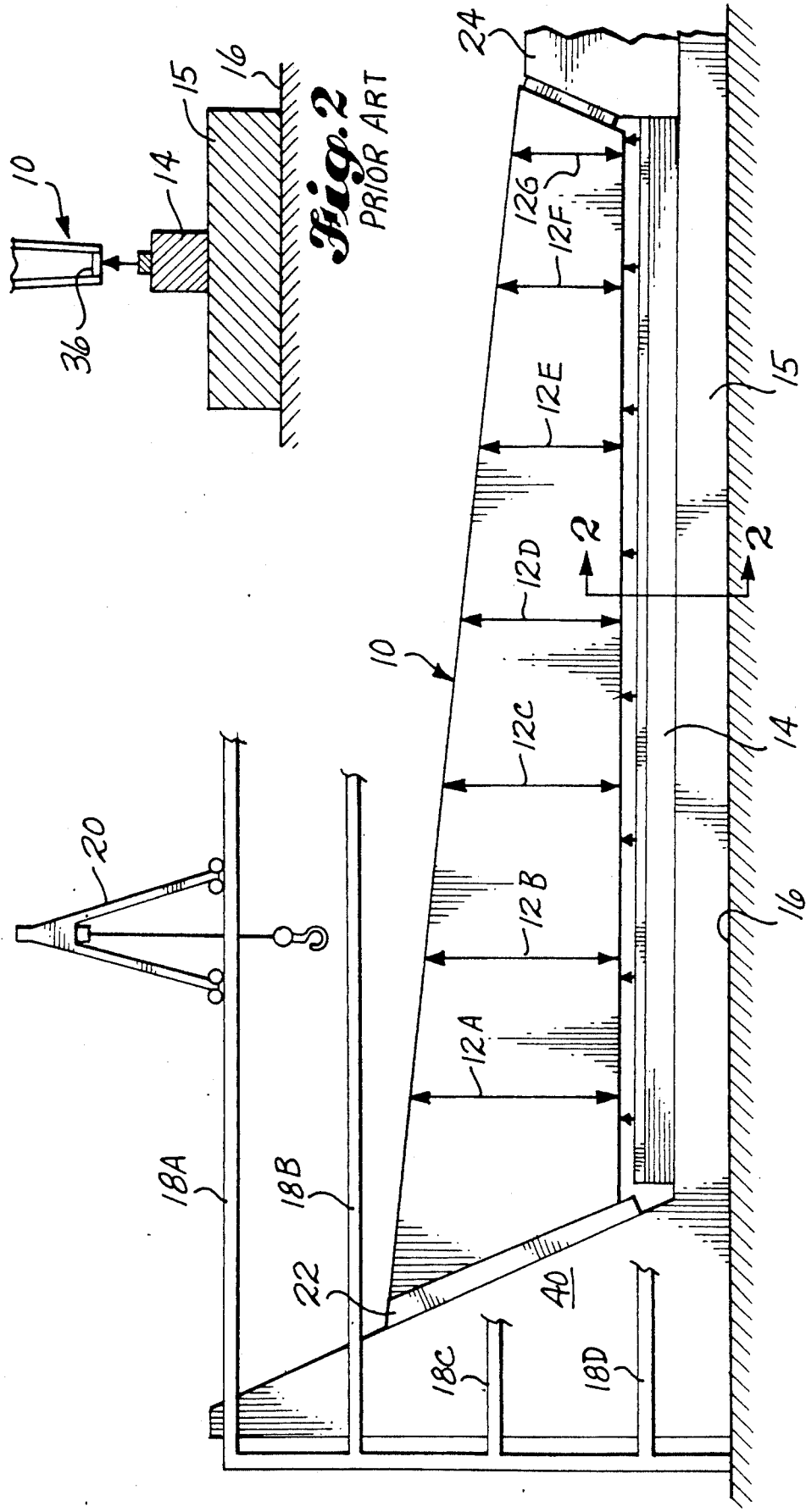

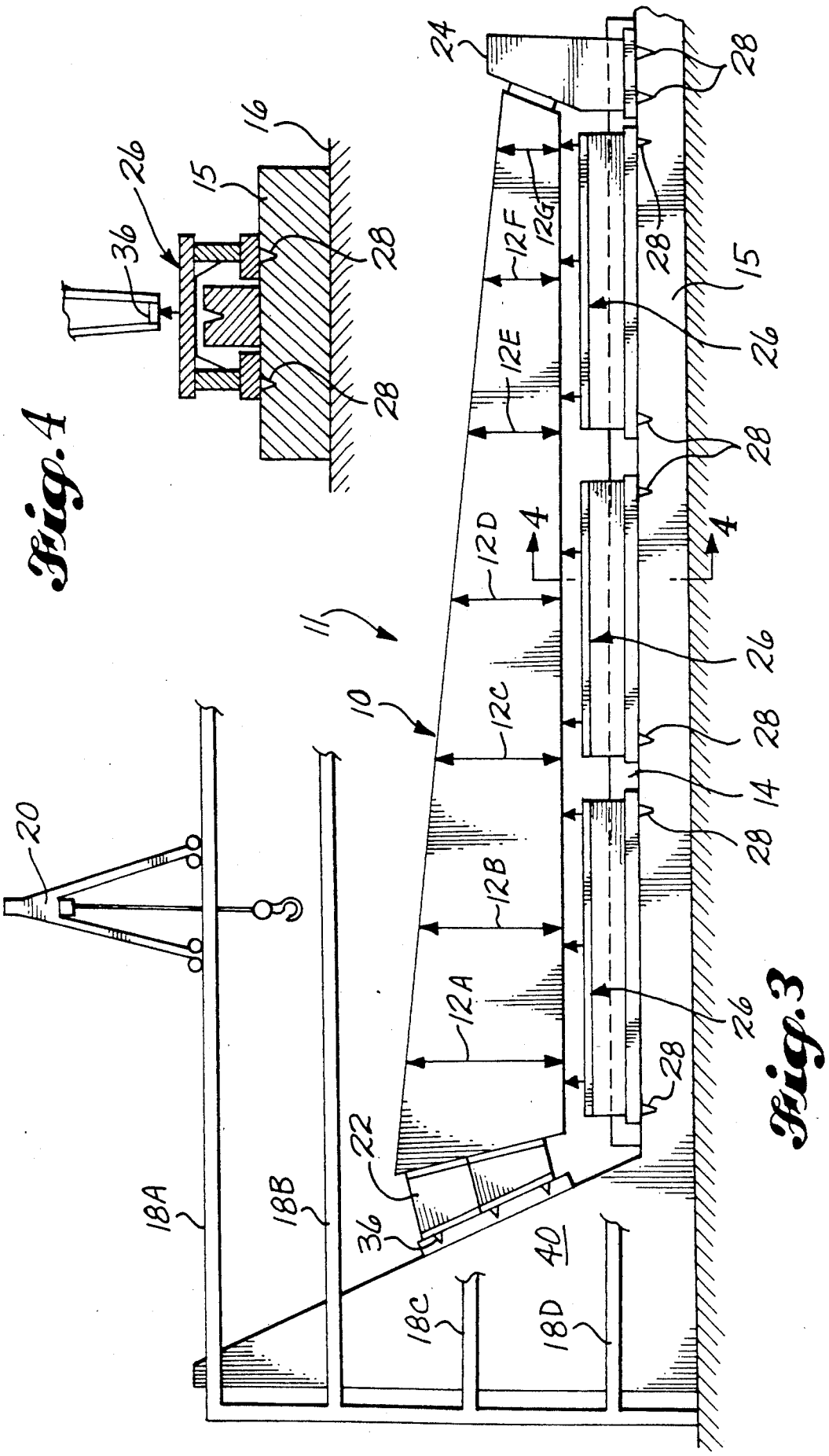

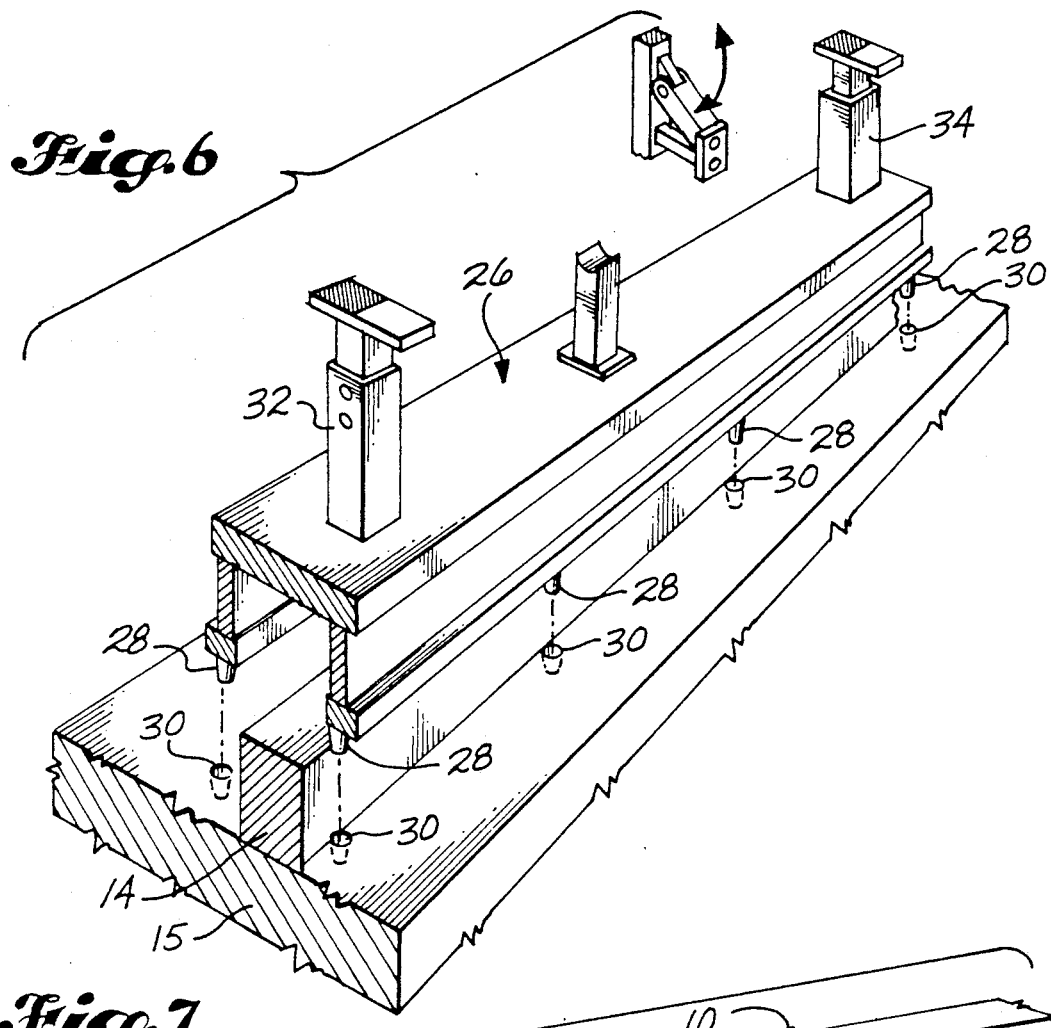
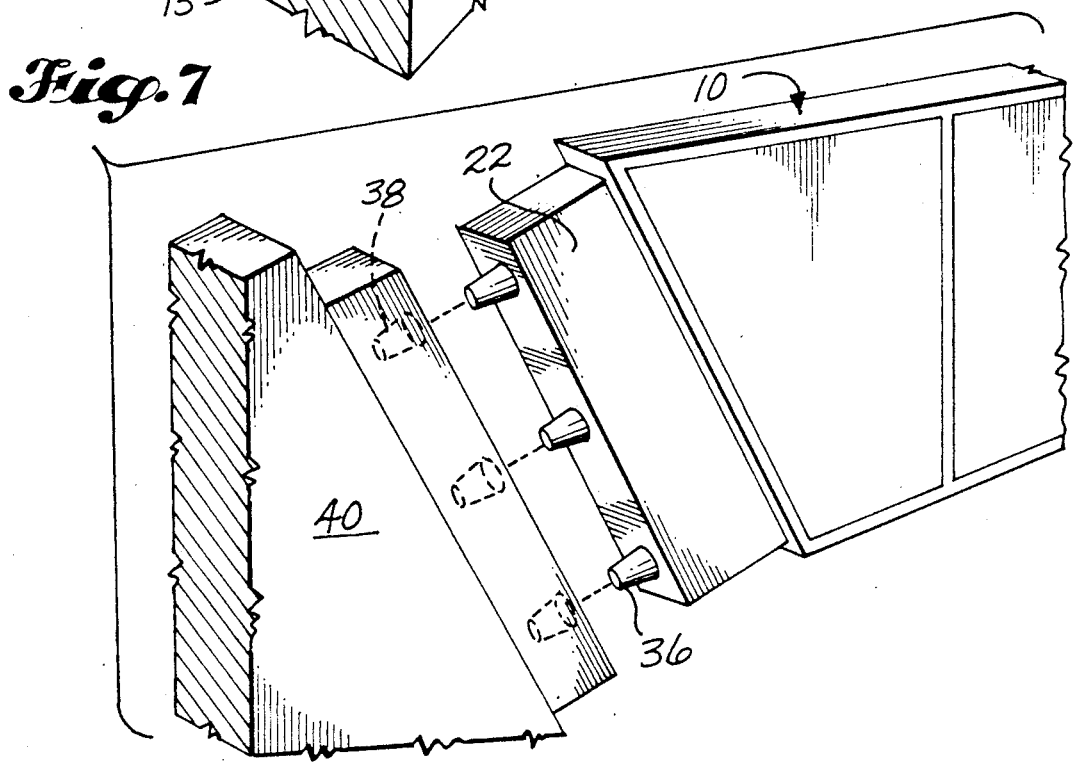

WING MAJOR ASSEMBLY JIG

DESCRIPTION

1. Technical Field

This invention relates to assembly jigs for making major structural components of aircraft, and more particularly, relates to jigs which are used to fabricate aircraft wings. The subject matter disclosed in this application is related to two other patent applications which I have previously filed, one on July 1, 1988 entitled, "Assembly Jig and Method for Making Wing Panels," Ser. No. 216,702) and the other on or about an even date herewith entitled, "Assembly Jig and Method for Making Wing Spars," (for which the serial number has not yet been assigned).

2. Background Art

The present invention addresses the same cost considerations discussed in my two previously filed co-pending applications. As is evident from their titles, these applications relate to wing panels and spars. In the typical wing manufacturing operation these components are taken to the wing major jig, which is the subject of this application, where they are assembled together along with ribs and other major parts into the wing box. As would be familiar to a person skilled in the art, the term "wing box" as used herein should be taken to mean a wing's main beam assembly minus flaps, slats, various hydraulics, etc., which carries flight loads and which acts as a fuel cell.

The Boeing Company, which is the assignee of the present invention, currently uses separate left-hand and right-hand wing major jigs for each wing box design produced. The invention disclosed here provides a generic wing major jig that provides the manufacturer with the capability of building all wing major boxes, left-hand or right, at the same wing major jig or tooling location.

Once again, this eliminates unnecessary duplication in tooling and labor, and greatly reduces floor space and other facility requirements. The economic considerations which make it desirable to use generic tooling in the aircraft industry are fully discussed in my other two applications and it is to be understood my comments there, and the disclosures made there, are incorporated herein by reference.

DISCLOSURE OF THE INVENTION

The present invention provides a generic wing major assembly jig having an elongated base to which a plurality of strongback modules are releasably mounted. Each strongback module has tooling supports which register the trailing edge or lower spar of the wing box under construction in the required position or, in other words, these supports define the true position of the lower spar and certain components to be affixed to the spar.

An inner stand-off module is positioned at one end of the jig's base and defines the position of the wing box's root end. This latter module is interchangable, meaning one stand-off module may be replaced by another to accommodate the need for defining different root positions in accordance with different wing designs.

The jig further includes an outer stand-off module generally positioned adjacent the other end of the base. This module defines the position of the wing box's tip end and the module's position is also adjustable depending on the particular wing which is to be assembled.

The chief advantages to the present invention are the same as those described in my co-pending applications relative to wing panel and wing spar construction methods. To briefly summarize what was stated there, a jig constructed in accordance with this invention can be used to manufacture virtually any wing design regardless of "hand" or number of spars employed. This eliminates duplication in tooling, and the higher costs associated therewith.

BRIEF DESCRIPTION OF THE DRAWINGS

In the drawings, like reference numerals and letters refer to like parts throughout the various views, and wherein:

FIG. 1 is a schematic side view, labeled "prior art," of a typical wing major jig which is currently in use by The Boeing Company;

FIG. 2 is a cross-sectional view taken along line 2—2 and shows the current strongback arrangement of the jig shown in FIG. 1;

FIG. 3 is a view like FIG. 1, but shows the wing major jig modified in accordance with the present invention so that any wing box can be constructed on the jig;

FIG. 4 is a view like FIG. 2, but shows the jig strongback modified in accordance with the invention;

FIG. 6 is a pictorial view of a strongback module designed in accordance with the present invention; and FIG. 7 is a fragmentary pictorial view of an inner stand-off module constructed in accordance with the invention.

BEST MODE FOR CARRYING OUT THE INVENTION

Figure 5:
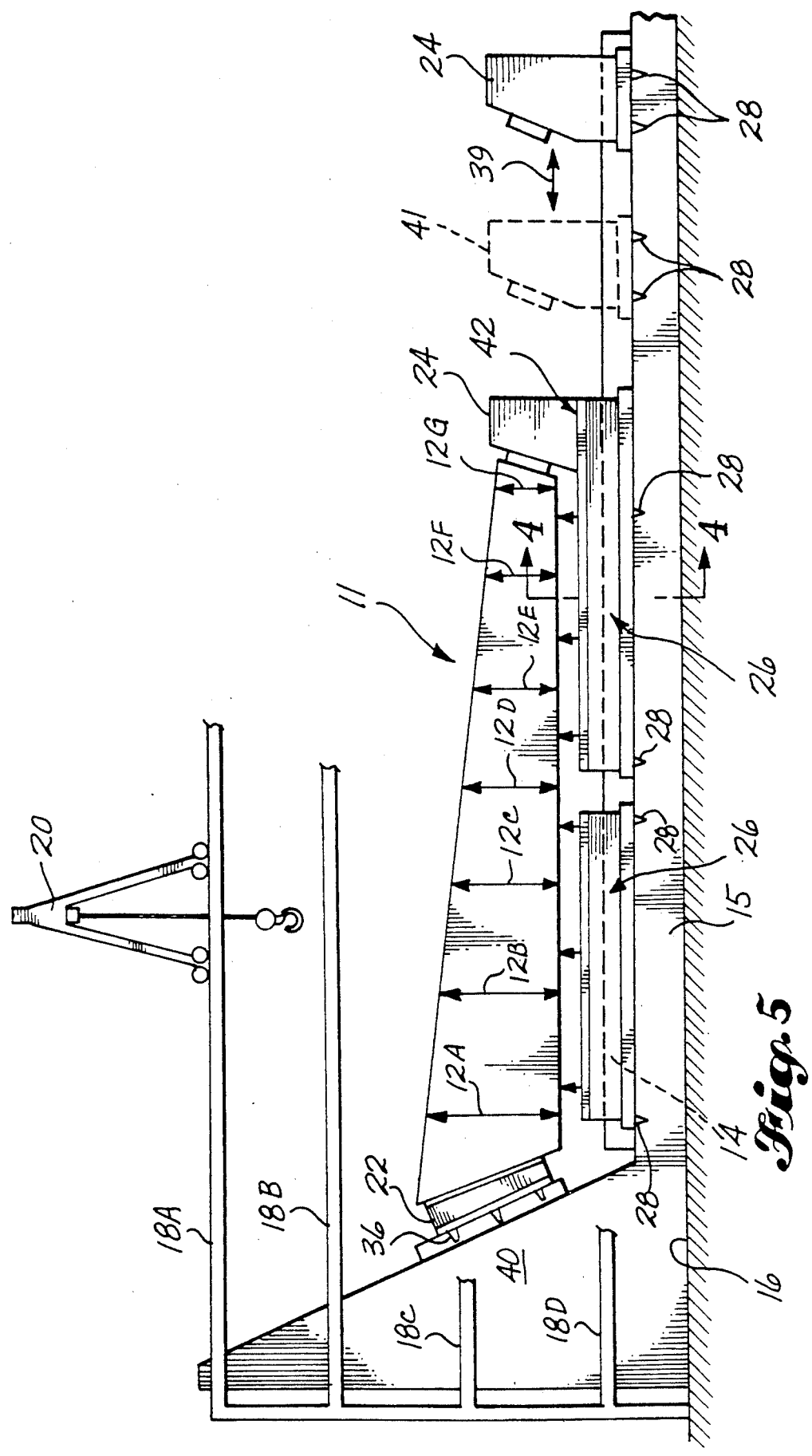
FIG. 5 is a view like FIG. 3, but shows jig adjustments for the purpose of constructing a different wing box.

In the drawings, and referring first to FIGS. 1 and 2, therein is shown at 10 a wing box, the general construction of which would be familiar to a person skilled in the art.

Briefly, arrows 12a-12g indicate the position of dummy tooling ribs which are used during the construction of the wing box 10, and reference numeral 14 indicates a strongback portion which is fixed to a base 15 on the floor 16 where the wing box 10 is assembled. Decks 18a-18d provide scaffolding around the wing box 10 and an overhead gantry 20 lowers components for assembly. Inner and outer stand-offs 22, 24, which are fixed in position, define the wing box's root and tip ends, respectively.

The arrangement shown in FIGS. 1 and 2 depicts a conventional wing major jig as is currently used by The Boeing Company in its Everett, Washington facilities. A separate jig of this general kind exists for each wing design, and for each "hand", meaning the facilities represented in FIGS. 1 and 2 are duplicated many times over in The Boeing Company.

Referring to FIG. 3, therein is shown at 11 a wing major jig constructed in accordance with the present invention. There, modular strongbacks 26 are mounted to base 15. The strongbacks 26 have downwardly depending pins 28 which fit or plug into pre-located recesses 30 in the base 15. This permits releasable mounting of the strongback modules 26 over portion 14 of base 15. Referring to FIG. 6, each strongback module 26 has a plurality of posts 32, 34 which define the position of the wing box's lower or trailing edge spar 36 (see FIG. 4).

One strongback module 26 may be replaced with another having a different height or different supporting posts 32, 34 depending on the particular wing box which is to be assembled in the jig. The wing box 10 is laterally supported in the jig 11 in an upstanding position by conventionally known methods.

The base 15 is sufficiently long to accommodate the longest wing box which is to be constructed on the jig 11. More than one set of strongbacks 26 may be mounted to the base in order to accommodate different wing length variations. For example, FIG. 3 shows three strongbacks 26 extending sequentially along the length of base 15. FIG. 5 shows two strongbacks for a shorter wing. Further, both left and right-hand sets of strongbacks would be used for assemblying either "hand" of a wing box in the same jig.

The inner stand-off module 22 (see FIG. 7) is interchangeable in much the same fashion as the strongback 26. By way of illustrative example, this module 22 may have pins 36 which fit in recesses 38 for temporarily fixing the inner module 22 to the root-end 40 of the jig. As would be familiar, the purpose of the inner module 22 is to define the position of the wing box's root end during construction of the box. The size of the inner module is dictated by the size of the particular wing box under construction, as is evident by comparing FIGS. 3 and 7. FIG. 3 shows a larger stand-off module 22 in accordance with one wing design; FIG. 5 shows a smaller module in accordance with another design.

The outer stand-off module is also adjustable. In one embodiment, the module 24 may be releasably mounted directly to base 15, as is shown in FIG. 3, so that it can be moved to various locations depending on the particular wing under construction. This is illustrated by arrow 39 and dashed lines 41 in FIG. 5. Mounting is accomplished in much the same manner as the way strongback 26 is mounted to the base (see FIG. 6). That is, this module 24 may fit over portion 14 of base 15 and have pins 28 which plug into base 15 at certain prelocated locations. In another embodiment, the outer module may be connected directly to the end of a strongback module 26 as is shown at 42 in FIG. 5. Strongback modules 26 could, of course, be of different lengths since these units are modular and are designed to be interchangeable depending on wing design. It should be appreciated that the shape and heights of the stand-off modules 22, 24 would vary in order to accommodate wing "sweep" angles and root or tip configurations employed on various airplane wings.

Thus, having provided the above description, it is to be understood that several changes could be made to the embodiment or embodiments disclosed above without departing from the spirit and scope of the invention. Therefore, the preceding description should not be regarded as limiting the scope and content of any patent coverage which is obtained. Rather, the invention is to be defined and limited only by the following patent claim or claims, wherein such claims are to be interpreted in accordance with the established doctrines of patent claim interpretation.

I claim:

1. A wing major assembly jig, comprising:
   an elongated base;
   at least one elongated strongback module removably mounted to said base, said module having means for supporting a lower spar of a wing box in a generally horizontally extending position, said module being mounted to said base in a manner so that said module may be interchanged with another strongback module;
   an inner stand-off module having means defining the position of the wing box's root end; and
   an outer stand-off module having means defining the position of the wing box's tip end.

2. The assembly jig of claim 1, wherein said elongated base has first and second ends, and wherein said inner stand-off module is releasably mounted to a separate support positioned outwardly of one end of said elongated base.

3. The assembly jig of claim 2, wherein said outer stand-off module is releasably mounted to said elongated base adjacent the other end of said elongated base.

4. The assembly jig of claim 1, wherein said outer stand-off module is mounted directly to said strongback module.

5. The assembly jig of claim 1, including a plurality of elongated strongback modules removably mounted to said base and extending sequentially along the length of said base.

6. A wing major assembly jig, comprising:
   an elongated base;
   at least one elongated strongback module removably mounted to said base, said module having means for defining the position of a lower spar of a wing box, and wherein said strongback module includes a plurality of downwardly depending pin members, and said elongated base has a plurality of upwardly opening recesses, said pin members being sized and positioned for male/female registration into said recesses, for mounting said strongback module to said elongated base;
   an inner stand-off module having means defining the position of the wing box's root end; and
   an outer stand-off module having means defining the position of the wing box's tip end.

7. The assembly jig of claim 1, wherein said means defining the position of the wing box's root end includes means defining the sweep angle of said root end.

8. The assembly jig of claim 1, wherein said means defining the position of the wing box's tip end includes means defining the sweep angle of said tip end.

9. The assembly jig of claim 1, wherein said outer stand-off module is releasably mountable to said base at various positions along the length of said base.

10. The assembly jig of claim 6, wherein said elongated base has first and second ends, and wherein said inner stand-off module is releasably mounted to a separate support positioned outwardly of one end of said elongated base.

11. The assembly jig of claim 10, wherein said outer stand-off module is releasably mounted to said elongated base adjacent the other end of said elongated base.

12. The assembly jig of claim 6, wherein said outer stand-off module is mounted directly to said strongback module.

13. The assembly jig of claim 6, wherein said outer stand-off module includes a plurality of downwardly depending pin members, said pin members being sized and positioned for male/female registration into said base's upwardly-opening recesses, for releasably mounting said outer stand-off module to said base.

14. The assembly jig of claim 6, wherein said means defining the position of the wing box's root end includes means defining the sweep angle of said root end.

15. The assembly jig of claim 6, wherein said means defining the position of the wing box's tip end includes means defining the sweep angle of said tip end.

16. The assembly jig of claim 6, wherein said outer stand-off module is releasably mountable to said base at various positionns along the length of said base.

* * * * *